(12) United States Patent
Ohba et al.

(10) Patent No.: US 8,140,915 B2
(45) Date of Patent: Mar. 20, 2012

(54) DETECTING APPARATUS, SYSTEM, PROGRAM, AND DETECTING METHOD

(75) Inventors: Nobuyuki Ohba, Sendai (JP);
Yoshitami Sakaguchi, Hadano (JP);
Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 12/046,832

(22) Filed: Mar. 12, 2008

(65) Prior Publication Data

US 2008/0263073 A1 Oct. 23, 2008

(30) Foreign Application Priority Data

Mar. 12, 2007 (JP) .................................. 2007-61959

(51) Int. Cl.
*G06F 11/00* (2006.01)
(52) U.S. Cl. ..................................................... 714/47.2
(58) Field of Classification Search .................... 714/47, 714/47.2; 702/186; 718/105
See application file for complete search history.

(56) References Cited

U.S. PATENT DOCUMENTS

| | | | | |
|---|---|---|---|---|
| 6,792,460 B2* | 9/2004 | Oulu et al. | ................... | 709/224 |
| 6,950,970 B2* | 9/2005 | Mishima | ......................... | 714/47 |
| 7,076,695 B2* | 7/2006 | McGee et al. | ................... | 714/47 |
| 7,197,432 B2* | 3/2007 | Russell | ........................... | 702/186 |
| 7,310,701 B2* | 12/2007 | Takeda et al. | ................... | 711/111 |
| 7,454,754 B2* | 11/2008 | Tajima | ........................... | 718/104 |
| 7,703,079 B1* | 4/2010 | Burrows et al. | ............... | 717/127 |
| 2007/0101202 A1* | 5/2007 | Garbow | ............................ | 714/47 |
| 2008/0141249 A1* | 6/2008 | Ohba et al. | ..................... | 718/100 |
| 2010/0083055 A1* | 4/2010 | Ozonat | ............................. | 714/47 |

FOREIGN PATENT DOCUMENTS

| | | |
|---|---|---|
| JP | 03-210643 | 9/1991 |
| JP | 04-068451 | 3/1992 |
| JP | 07-234853 | 9/1995 |
| JP | 2003-242508 | 8/2003 |

* cited by examiner

*Primary Examiner* — Joshua Lohn
(74) *Attorney, Agent, or Firm* — William Stock; Anne Vachon Dougherty

(57) ABSTRACT

A detecting apparatus including a cluster storing unit that stores, for each of clusters into which execution time of previously executed monitored tasks are classified, the range of execution times belonging to the cluster, an acquiring unit that acquires an execution time of the monitored task in response to new execution of the monitored task on the information processing apparatus, and a determining unit that determines the occurrence of an extraordinary behavior during the execution of the monitored task if the execution time of the newly executed monitored task does not fall within any of the ranges corresponding to the clusters.

21 Claims, 11 Drawing Sheets

[Figure 2]

[Figure 4]
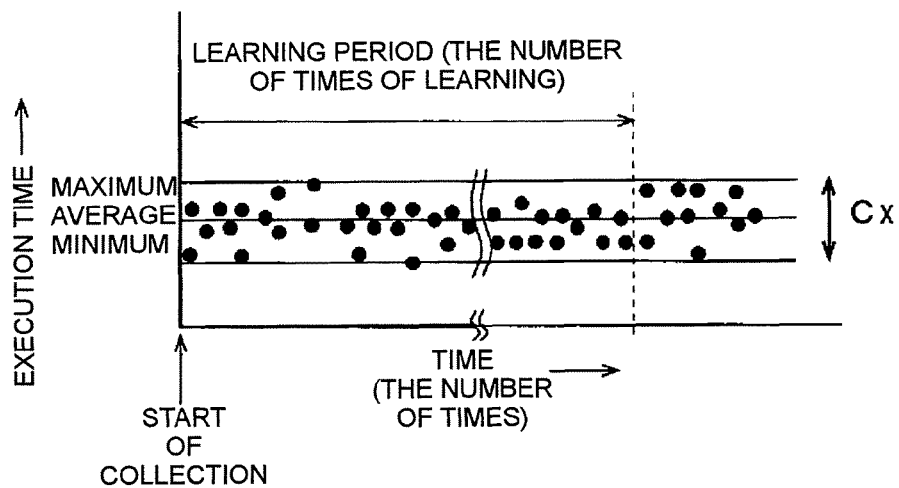
[Figure 5]
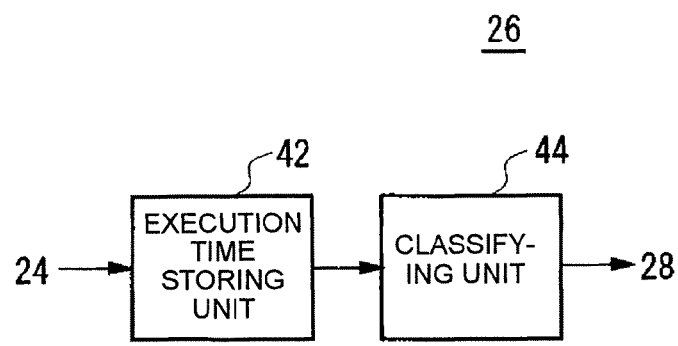

[Figure 6]
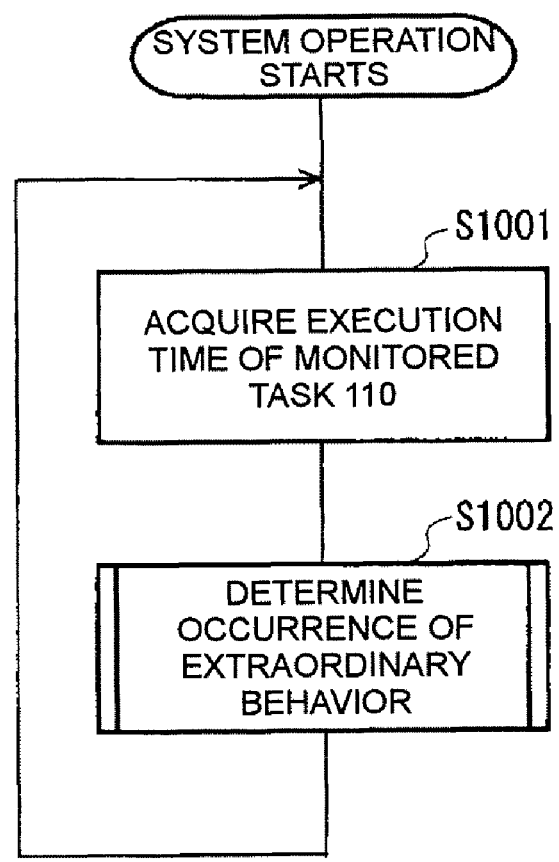

[Figure 7]
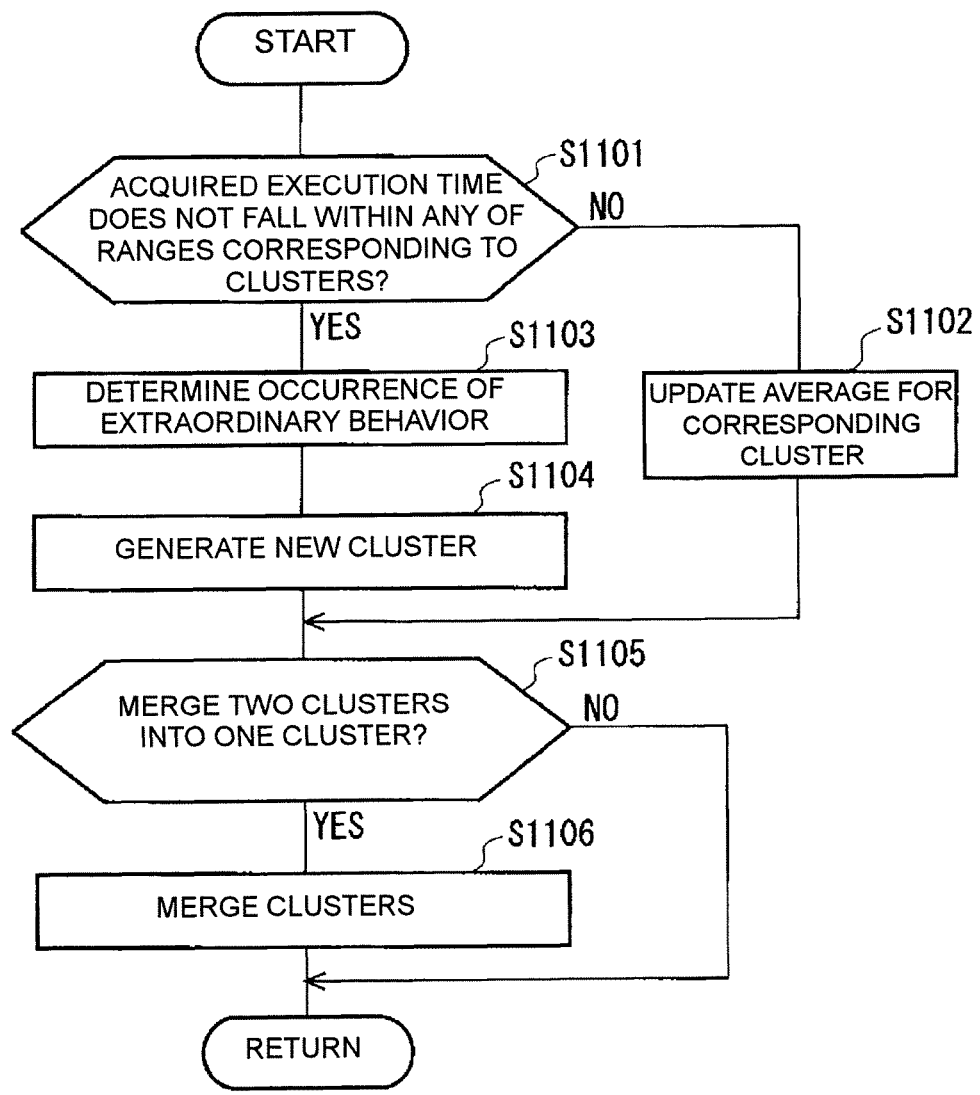

DETECTING APPARATUS, SYSTEM, PROGRAM, AND DETECTING METHOD

FIELD OF THE INVENTION

The present invention relates to detecting apparatuses, systems, programs, and detecting methods. More particularly, the present invention relates to a detecting apparatus, system, program, and detecting method for detecting whether or not an extraordinary behavior occurred during the execution of monitored tasks on an information processing apparatus.

BACKGROUND OF THE INVENTION

With growing complexity of embedded software in information processing apparatuses such as control systems, the time spent for verification and debugging of hardware and software is increasing. To address this, it is possible to find hardware and software problems by detecting abnormal behavior (an anomaly point), and to perform verification and debugging of the operation of the information processing apparatus around the detected anomaly point. This makes verification and debugging effective, and therefore reduces the total time spent for the verification and debugging.

Japanese Published Unexamined Patent Application No. 4-68451 describes an invention that stores the names of running tasks at predetermined time intervals and estimates the occupancy rate of the execution time of each task based on the binomial distribution. Patent Document 2 describes an invention that measures the execution time of each task in a computer system executing a plurality of tasks in parallel. More specifically, the invention described in Japanese Published Unexamined Patent Application No. 3-210643 provides an execution time accumulation area for each task, adds the processing time of the task to the execution time accumulation area after the task completion, and, if the task was interrupted by a lower-order task, subtracting the processing time of the lower-order task from the execution time accumulation area.

Japanese Published Unexamined Patent Application No. 2003-242508 describes a method of clustering a plurality of sample points. In this method, a first sum total value of errors between each sample point in a cluster and the centroid of the cluster is summed across a plurality of clusters to compute a second sum total value. As the number of clusters is varied from the maximum toward the minimum, the second sum total value rapidly changes at a certain point. Either number of clusters before or after this point is determined to be an optimal number of clusters. The sample points are clustered into the optimal number of clusters.

Japanese Published Unexamined Patent Application No. 7-234853 describes a cluster classification apparatus that classifies input data. This cluster classification apparatus uses one-dimensional self-organizing feature mapping to generate a map consisting of a prototype group for the input data and classifies the input data according to the map.

For detecting an anomaly point in the operation of an information processing apparatus, the internal state of the information processing apparatus is captured for a long time and exhaustively analyzed. However, this method is inefficient in that a huge amount of internal state is stored. In addition, for detecting an anomaly point in an information processing apparatus requiring real-time operations, for example a controller for a vehicle engine, it is preferable to make as few changes as possible to the embedded software.

Thus, the objective of the present invention is to provide a detecting apparatus, system, program, and detecting method that are capable of solving the above-mentioned problems. The objective is achieved by combinations of features set forth in independent Claims. Dependent Claims define further advantageous embodiments of the present invention.

SUMMARY OF THE INVENTION

To solve the above-mentioned problems, according to a first aspect of the present invention, there is provided a detecting apparatus that detects whether or not an extraordinary behavior occurred during the execution of monitored tasks on an information processing apparatus, including: a cluster storing unit that stores ranges corresponding to clusters into which execution times of the previously executed monitored task are classified with the upper limit of each cluster being the maximum execution time in the cluster and the lower limit of each cluster being the minimum execution time in the cluster, wherein the upper limit of each range is the maximum of the execution times belonging to the corresponding cluster and the lower limit of each range is the minimum of the execution times belonging to the corresponding cluster; an acquiring unit that acquires an execution time of the monitored task in response to new execution of the monitored task on the information processing apparatus; and a determining unit that determines the occurrence of an extraordinary behavior during the execution of the monitored task if the execution time of the newly executed monitored task does not fall within any of the ranges corresponding to the clusters. There is also provided a system including this detecting apparatus and the information processing apparatus.

According to a second aspect of the present invention, there is a program that detects whether or not an extraordinary behavior occurred during execution of a monitored task on an information processing apparatus by means of the information processing apparatus or another information processing apparatus, the program causing the information processing apparatus or the other information processing apparatus to function as: a cluster storing unit that stores, in a storage device provided in the information processing apparatus or the other information processing apparatus, ranges corresponding to clusters into which execution times of the previously executed monitored task are classified with the upper limit of each cluster being the maximum execution time in the cluster and the lower limit of each cluster being the minimum execution time in the cluster, wherein the upper limit of each range is the maximum of the execution times belonging to the corresponding cluster and the lower limit of each range is the minimum of the execution times belonging to the corresponding cluster; an acquiring unit that acquires an execution time of the monitored task in response to new execution of the monitored task on the information processing apparatus; and a determining unit that determines the occurrence of an extraordinary behavior during the execution of the monitored task if the execution time of the newly executed monitored task does not fall within any of the ranges corresponding to the clusters. There is also a detecting method implemented by this program executed in the information processing apparatus.

The above summary of the invention does not recite all necessary features of the present invention. The present invention may also include sub-combinations of these features.

BRIEF DESCRIPTION OF THE DRAWINGS

The invention will be described in greater detail with reference to the appended figures in which:

FIG. 4 shows an example in which execution times belonging to a cluster Cx are plotted in two-dimensional space, where the X-axis indicates the execution point in time and the Y-axis indicates the execution time;

FIG. 5 shows an exemplary configuration of a cluster generating unit 26 according to the embodiment;

FIG. 6 shows a processing flow of the detecting apparatus 10 according to the embodiment;

FIG. 7 shows exemplary details of a processing flow in step S1002 of FIG. 6;

DETAILED DESCRIPTION OF THE INVENTION

The present invention will be described below with respect to its embodiments. The embodiments below are not intended to limit the present invention defined in the Claims, and not all combinations of features described in the embodiments are essential for means to solve the present invention.

Figure 1:
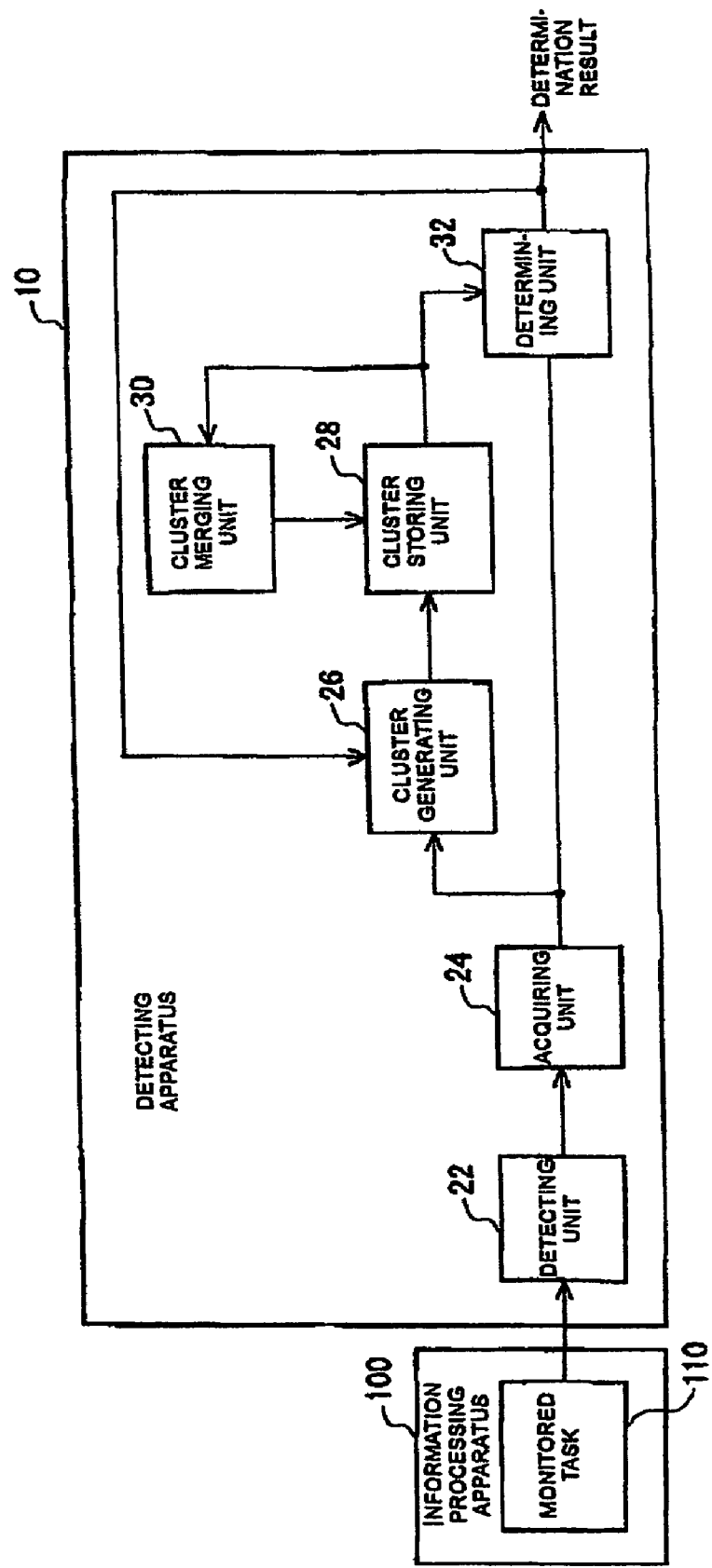
FIG. 1 shows the configuration of a detecting apparatus 10 according to an embodiment of the present invention together with an information processing apparatus 100.
Figure 2:
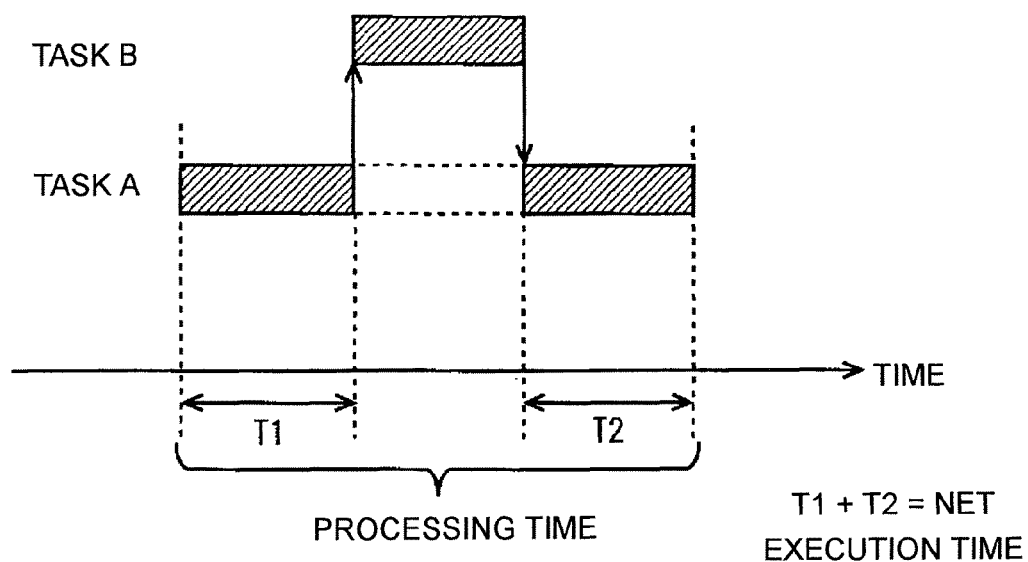
FIG. 2 shows an exemplary execution time of a monitored task 110.

FIG. 1 shows the configuration of a detecting apparatus 10 according to an embodiment of the present invention together with an information processing apparatus 100. FIG. 2 shows an exemplary execution time of a monitored task 110. The detecting apparatus 10 takes at least one predetermined monitored task 110 among a variety of tasks executed by the information processing apparatus 100 and detects whether or not an extraordinary behavior occurred during the execution of the monitored task 110 on the information processing apparatus 100.

A task refers to processing performed by a processor of the information processing apparatus 100. The task also includes functions, processes, and threads. The information processing apparatus 100 may be hardware executing embedded software, and the task may include functions, processes, and threads, which are executed as the embedded software. For example, the information processing apparatus 100 may be an information processing apparatus executing embedded software requiring real-time operations like a controller for in-vehicle equipment such as an in-vehicle engine.

As an example, an extraordinary behavior of the task refers to a behavior different from normal behaviors of the task executed by the information processing apparatus 100 for a plurality of times. Exemplary extraordinary behaviors of the task include a rarely occurring behavior, an unexpected behavior, and an exceptional behavior. For example, if a program or hardware that has invoked the task or the task itself can include an abnormality, the task behaves in an extraordinary manner. Although an extraordinary behavior does not necessarily correspond to a failure or defect, it is considered to be likely to do so.

The detecting apparatus 10 includes a detecting unit 22, an acquiring unit 24, a cluster generating unit 26, a cluster storing unit 28, a cluster merging unit 30, and a determining unit 32. The detecting unit 22 detects the execution time for each execution cycle in response to the execution of the monitored task 110 for a plurality of times on the information processing apparatus 100.

As shown in FIG. 2, the execution time of the task may be the net execution time or the processing time of the task, for example. The net execution time of the task is the net time during which the task is executed by the processor, and does not include the suspension time during which the task is interrupted by another task. The processing time of the task is the time from the start to the termination of the task and includes the suspension time during which the task is interrupted by another task.

As an example, the detecting unit 22 may detect the execution time on the information processing apparatus 100 via a hardware interface. As another example, if the detecting apparatus 10 is implemented on the information processing apparatus 100 by a program executed on the information processing apparatus 100, the detecting unit 22 may detect the execution time of the monitored task 110 via a software interface.

As yet another example, the monitored task 110 or a task scheduler of the information processing apparatus 100 may write a flag, a task ID, and so on into a predetermined register upon the start of the monitored task 110, and to delete the flag, the task ID, and so on written in the register upon termination of the monitored task 110. The detecting unit 22 may then read the predetermined register at certain intervals to detect the execution time of the monitored task 110. As yet another example, the detecting unit 22 may periodically issue a command to the information processing apparatus 100 for retrieving the task execution state of the information processing apparatus 100, and detect the execution time of the monitored task 110 based on the response to the command.

The acquiring unit 24 acquires the execution time of the monitored task 110 in response to new execution of the monitored task 110 on the information processing apparatus 100. As an example, the acquiring unit 24 may acquire the execution time of the monitored task 110 via the detecting unit 22 in real time during the operation of the information processing apparatus 100.

The acquiring unit 24 preferably acquires the execution time for all execution cycles of the monitored task 110 executed by the information processing apparatus 100 during a measuring period. However, the acquiring unit 24 may acquire the execution time for part of all execution cycles of the monitored task 110 during the measurement period, for example it may acquire the execution time at certain intervals.

The cluster generating unit 26 generates at least one cluster into which execution times of the previously executed monitored task 110 are classified according to the magnitude of their values. For each cluster into which the execution time of the previously executed monitored task 110 are classified, the cluster storing unit 28 stores the range of the execution times belonging to the cluster.

As the range of the execution time, the cluster storing unit 28 stores the maximum, minimum, and average of the execution time belonging to each cluster. If the distance between execution times belonging to one cluster and execution times belonging to a cluster adjacent to the one cluster is less than a predetermined value, the cluster merging unit 30 merges the one cluster and the adjacent cluster into a single cluster.

If the execution time of the newly executed monitored task 110 acquired by the acquiring unit 24 does not fall within any of the ranges corresponding to the clusters stored by the cluster storing unit 28, the determining unit 32 determines the occurrence of an extraordinary behavior during the execution of the monitored task 110. Once the occurrence of an extraordinary behavior is determined, the determining unit 32 externally outputs the determination result.

According to this detecting apparatus 10, whether or not an extraordinary behavior occurred during the execution of the monitored task 110 on the information processing apparatus 100 can be detected with a simple configuration.

Figure 3:
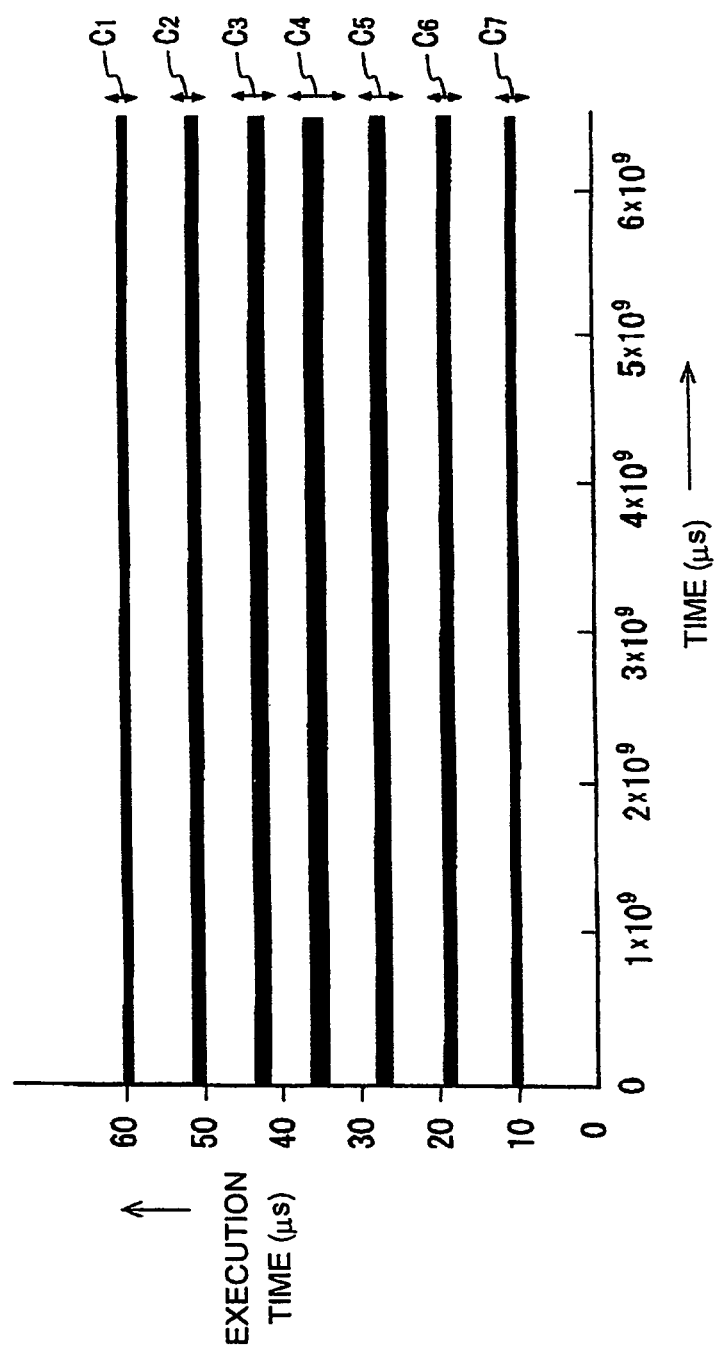
FIG. 3 shows a diagram in which exemplary execution time at respective execution points in time of the monitored task 110 executed for a plurality of times on the information processing apparatus 100 are plotted in two-dimensional space, where the X-axis indicates the execution point in time and the Y-axis indicates the execution time.

FIG. 3 shows a diagram in which exemplary execution times at respective execution points in time of the monitored task 110 executed for a plurality of times on the information processing apparatus 100 are plotted in two-dimensional space, where the X-axis indicates the execution point in time and the Y-axis indicates the execution time. If processing of the monitored task 110 includes a branch condition (e.g., IF-THEN-ELSE processing), loop processing varying in the number of loops depending on conditions, or the like, the execution time of the monitored task 110 varies with the set conditions. In such a case, execution times of the monitored task 110 are distributed around a plurality of values. For example, in the example shown in FIG. 3, the execution times of the monitored task 110 concentrate around seven values: 11 µs, 19 µs, 27 µs, 35 µs, 43 µs, 52 µs, and 60 µs.

Here, if the monitored task 110 behaves in an extraordinary manner, the execution time assumes a value out of any of the ranges distributed around these values. Therefore, the detecting apparatus 10 generates clusters into which the execution times of the monitored task 110 are classified according to the magnitude of their values. If execution time that does not belong to any clusters is newly seen, the detecting apparatus 10 determines the occurrence of an extraordinary behavior during the execution of the monitored task 110 on the information processing apparatus 100.

In the example shown in FIG. 3, the detecting apparatus 10 generates seven clusters C1 to C7 centering around the values 11 µs, 19 µs, 27 µs, 35 µs, 43 µs, 52 µs, and 60 µs, respectively. The detecting apparatus 10 then determines whether or not an extraordinary behavior occurred during the execution of the monitored task 110 by determining whether or not the newly acquired execution time belongs to any of these clusters C1 to C7.

FIG. 4 shows an example in which exemplary execution time belonging to a cluster Cx are plotted in two-dimensional space, where the X-axis indicates the execution point in time and the Y-axis indicates the execution time. For each cluster generated by the cluster generating unit 26, the cluster storing unit 28 stores the maximum, minimum, and average of the execution time of the previously executed monitored task 110. By storing the maximum and minimum of the execution time belonging to each cluster, the cluster storing unit 28 can cause the determining unit 32 to determine whether or not a collected execution time belongs to the cluster. Further, by storing the maximum, minimum, and average, the cluster storing unit 28 can cause the cluster merging unit 30 to determine whether or not to merge two adjacent clusters into one cluster.

In addition to this, for each cluster, the cluster storing unit 28 may store the number of times of collection of the execution times of the previously executed monitored task 110. This allows the cluster storing unit 28 to cause the cluster merging unit 30 to compute the average for a new cluster generated by merging two adjacent clusters into one cluster.

The cluster generating unit 26 classifies the execution times collected during a predetermined period (learning period) beginning from the start of collecting the execution times of the monitored task 110 and generates at least one cluster. Alternatively, the cluster generating unit 26 may classify a predetermined number (the number of times of learning) of execution times counted from the start of collecting the execution times of the monitored task 110 and generate at least one cluster.

Further, as an example, the determining unit 32 detects whether or not an extraordinary behavior occurred during the execution of the monitored task 110 for an execution time collected after the predetermined learning period or after the predetermined number of times of learning is exceeded. That is, in the learning period or before the number of times of learning is exceeded, the determining unit 32 may not detect whether or not an extraordinary behavior occurred during the execution on the information processing apparatus 100. In this manner, the detecting apparatus 10 can be made not to detect the occurrence of an extraordinary behavior for the execution times belonging to clusters generated during the learning period.

In response to the determination of the occurrence of an extraordinary behavior by the determining unit 32, the cluster generating unit 26 may generate a new cluster in addition to the previously generated clusters. The cluster generating unit 26 may then classify the execution time determined not to fall within any of the ranges corresponding to the clusters into the new cluster.

Once the new cluster is generated in this manner, the determining unit 32 will not determine any similar execution times collected thereafter to be extraordinary behaviors. Therefore, the detecting apparatus 10 does not need redundant storage of the internal state in the case such as the occurrence of a plurality of similar extraordinary behaviors, or the occurrence of a behavior absent during the learning period (up to the number of times of learning) but not extraordinary. This enables efficient verification, debugging, and so on of the information processing apparatus 100.

The detecting apparatus 10 may start detection of the occurrence of extraordinary behaviors in the state where the number of clusters is zero on condition that a new cluster is generated in response to determination of the occurrence of an extraordinary behavior, and that clusters close to each other are merged into one cluster. Thus, the detecting apparatus 10 can start detection of extraordinary behaviors without setting the learning period (or the number of times of learning).

In this case, the detecting apparatus 10 detects extraordinary behaviors more frequently just after starting its operation. However, after a period corresponding to the learning period (or the number of times of learning), the detecting apparatus 10 can detect extraordinary behaviors as in the case where the learning period (or the number of times of learning) is set.

FIG. 5 shows an exemplary configuration of the cluster generating unit 26 according to this embodiment. As an example, the cluster generating unit 26 may generate clusters by classifying the execution times collected during the learning period (or up to the number of times of learning) all at once after the learning period (or after the number of times of learning is exceeded).

In this case, as an example, the cluster generating unit 26 may include an execution time storing unit 42 and a classifying unit 44. The execution time storing unit 42 sequentially stores the execution time data collected during the predetermined learning period, or the execution time corresponding to the predetermined number of times of learning. The classifying unit 44 classifies each of the execution times collected during the predetermined learning period, or the execution times corresponding to the predetermined number of times of learning, into clusters. The classifying unit 44 may generate clusters by using a method in which execution times sequentially stored during the learning period or up to the number of times of learning are classified together if their ratio to the maximum of differences of the one-dimensionally distributed execution times is below a predetermined reference ratio.

In this manner, the cluster generating unit 26 can optimally cluster all data during the learning period irrespective of the order of occurrence. The detecting apparatus 10 may mask the detection of extraordinary behaviors during a period in which the cluster generating unit 26 is collecting the execution times.

FIG. 6 shows a processing flow of the detecting apparatus 10 according to this embodiment. The detecting apparatus 10 performs processing of steps S1001 to S1002 during the operation of the information processing apparatus 100.

First, for each execution cycle of the monitored task 110 on the information processing apparatus 100, the acquiring unit 24 acquires the execution time of the monitored task 110 in the execution cycle (S1001). Once the execution time is acquired by the acquiring unit 24, the determining unit 32 determines whether or not an extraordinary behavior occurred during the execution of the monitored task 110 based on the acquired execution time (S1002). The detecting apparatus 10 repeats the processing of steps S1001 and S1002 for each execution cycle of the monitored task 110.

Figure 8:
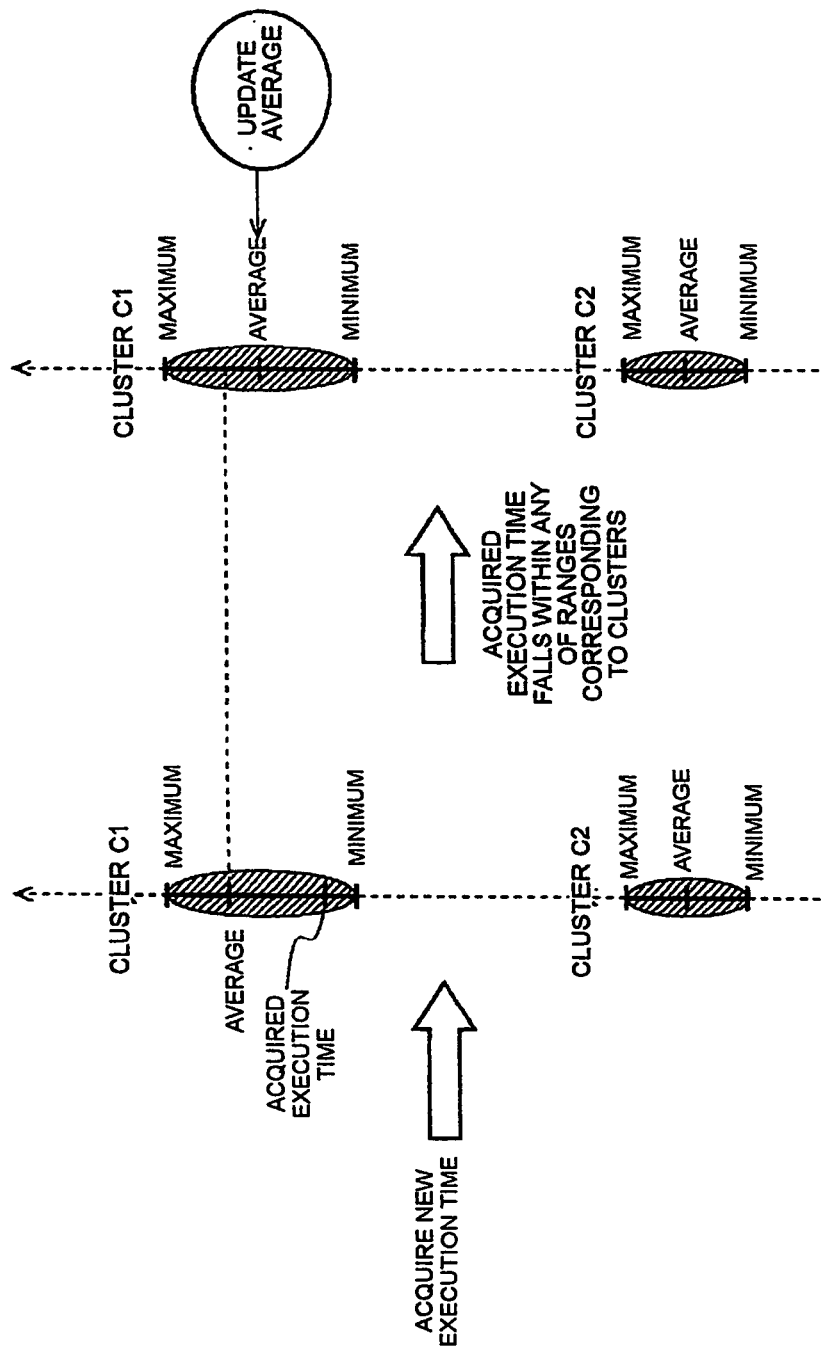
FIG. 8 shows exemplary processing in step S1102 of FIG. 7.
Figure 9:
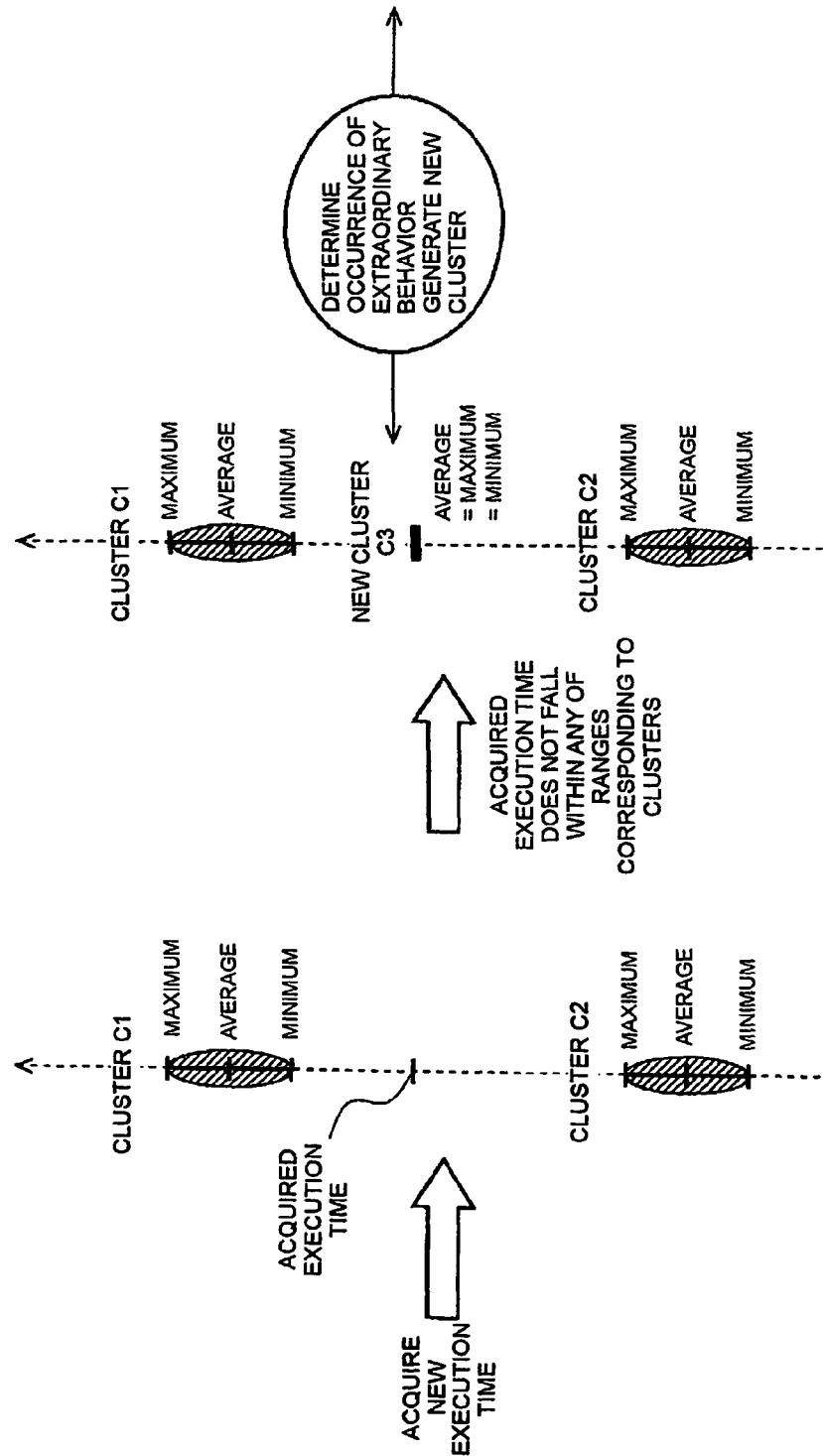
FIG. 9 shows exemplary processing in steps S1103 and S1104 of FIG. 7.
Figure 10:
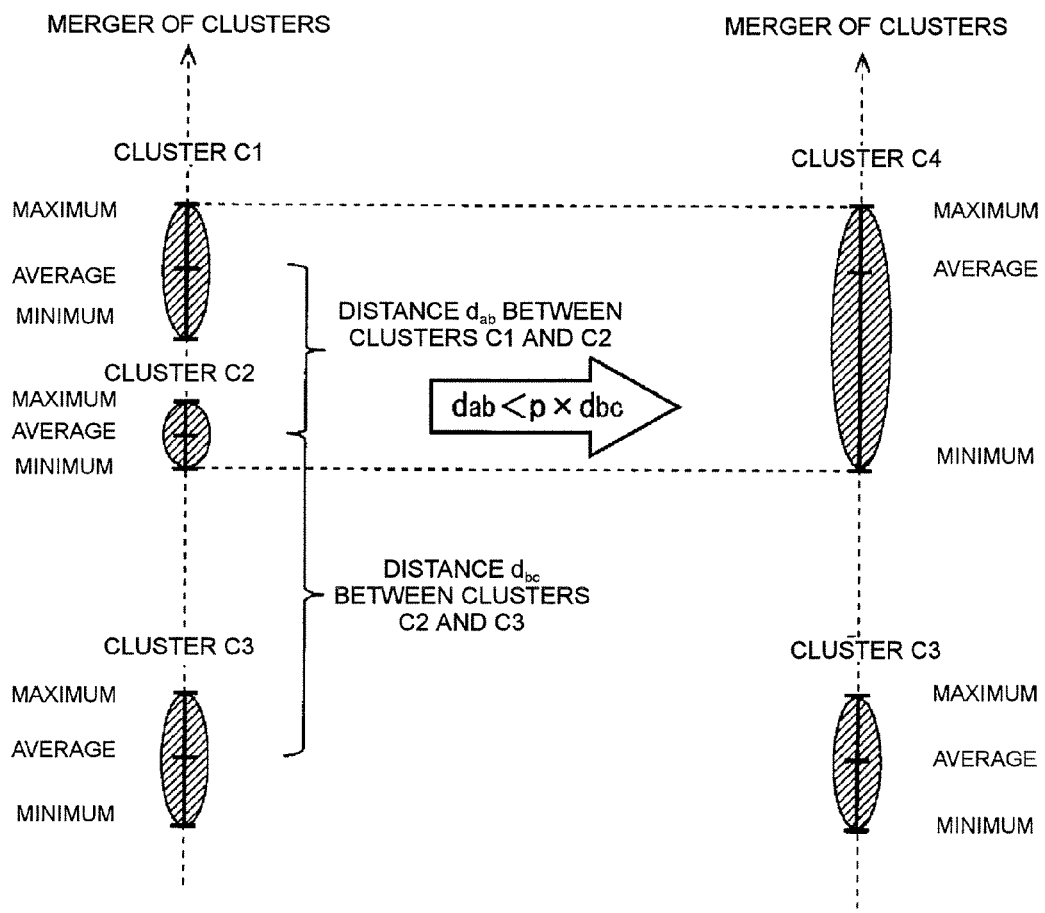
FIG. 10 shows exemplary processing in steps S1105 and S1106 of FIG. 7.

FIG. 7 shows exemplary details of a processing flow in step S1002 of FIG. 6. FIG. 8 shows exemplary processing in step S1102 of FIG. 7. FIG. 9 shows exemplary processing in steps S1103 and S1104 of FIG. 7. FIG. 10 shows exemplary processing in steps S1105 and S1106 of FIG. 7.

First, the determining unit 32 determines whether the execution time acquired by the acquiring unit 24 does not fall within any of the ranges corresponding to the clusters (S1101). If the acquired execution time does not fall within the range not greater than the maximum and not smaller than the minimum of each cluster, the determining unit 32 determines that the execution time does not fall within the ranges corresponding to the clusters (Yes in S1101). If the acquired execution time falls within the range not greater than the maximum and not smaller than the minimum of any of the clusters stored by the cluster storing unit 28, the determining unit 32 determines that the execution time falls within the range corresponding to that cluster (No in S1101).

If the acquired execution time falls within any of the ranges corresponding to the clusters (No in S1101), the cluster generating unit 26 updates the average for the corresponding cluster (S1102). Here, the cluster generating unit 26 may not update the maximum and minimum for the corresponding cluster.

For example, as shown in FIG. 8, the cluster generating unit 26 computes the new average of execution times belonging to the cluster C1, including the acquired execution time, and updates the average for the cluster C1. By updating the average for the corresponding cluster in this manner, the cluster generating unit 26 can cause proper determination whether or not to merge two adjacent clusters into one cluster. Upon finishing step S1102, the cluster generating unit 26 continues the processing with step S1105.

In response to the determination of the occurrence of an extraordinary behavior by the determining unit 32, the cluster generating unit 26 generates a new cluster (S1104). Once the new cluster is generated by the cluster generating unit 26, the cluster storing unit 28 stores the maximum, minimum, and average of the execution time belonging to the new cluster, as well as the number of times of collection.

For example, as shown in FIG. 9, if the acquired execution time belongs to neither the cluster C1 nor the cluster C2 and therefore the occurrence of an extraordinary behavior is determined, the cluster generating unit 26 generates a new cluster C3 to which the acquired execution time belongs. Just after being generated, the new cluster C3 has only one execution time belonging to itself. Therefore, the cluster storing unit 28 stores "one" as the number of times of collection of execution times belonging to the new cluster C3, and stores the same values for the maximum, minimum, and average.

By generating the new cluster in this manner, the cluster generating unit 26 can prevent any similar execution time collected thereafter from being determined as extraordinary behaviors, thereby preventing redundant storage of the internal state on the occurrence of similar behaviors. Upon finishing step S1104, the cluster generating unit 26 continues the processing with step S1105.

The cluster merging unit 30 then determines whether or not to merge two clusters into one cluster (S1105). As an example, the cluster merging unit 30 may use the average as the execution time of a cluster. If the ratio of the difference in the execution time between one cluster and a cluster adjacent to the one cluster to the maximum of the differences in the execution time between the one cluster and each of other clusters is less than a reference ratio, the cluster merging unit 30 may determine to merge the two clusters into one cluster.

For example, as shown in FIG. 10, the cluster merging unit 30 computes the difference (the distance $d_{ab}$ between the averages) in the execution time between the cluster C2 and the cluster C1 adjacent to the cluster C2, and the maximum (e.g., the distance $d_{bc}$ between the averages of the cluster C2 and the cluster C3) of the differences (the distances between the averages) in the execution time between the cluster C2 and other clusters. The cluster merging unit 30 then determines whether or not the distance $d_{ab}$ is less than the distance $d_{bc}$ multiplied by a reference ratio p, i.e., ($p \times d_{bc}$), wherein p is a value smaller than one, for example a predetermined value such as 0.1. If the distance $d_{ab}$ is less than the distance $d_{bc}$ multiplied by the reference ratio p, i.e., ($p \times d_{bc}$), the cluster merging unit 30 may determine that the cluster C2 and the cluster C1 should be merged.

Instead of the average, the cluster merging unit 30 may use the maximum or minimum as the execution time. That is, the cluster merging unit 30 may determine whether or not the ratio of the difference in the maximum or minimum between one cluster and a cluster adjacent to the one cluster to the maximum of the differences in the maximum or minimum between the one cluster and each of other clusters is less than a reference ratio. Alternatively, as the difference in the execution time between one cluster and a cluster adjacent to the one cluster, and as the difference in the execution time between the one cluster and yet another cluster, the cluster merging unit 30 may compute the minimum for the cluster that includes longer execution times, and the minimum for the cluster that includes shorter execution time.

Instead of the above, the cluster merging unit 30 may merge two clusters into one cluster if the difference in the execution time between the two clusters is less than a predetermined reference difference. In this case, again, the cluster merging unit 30 may use any of the maximum, minimum, and average as the execution time for the clusters. Also, as the difference in the execution time between one cluster and a cluster adjacent to the one cluster, and as the difference in the execution time between the one cluster and yet another cluster, the cluster merging unit 30 may compute the minimum for the cluster that includes longer execution times, and the minimum for the cluster that includes shorter execution times.

In this manner, the cluster merging unit 30 can appropriately determine that the distance between the execution time of one cluster and that of a cluster adjacent to the one cluster is less than a predetermined value, and appropriately merge these clusters close to each other. If the cluster merging unit 30 determines not to merge the two clusters into one cluster, it terminates the processing of steps S1101 to S1106 (No in S1105). If the cluster merging unit 30 determines to merge the two clusters into one cluster, it continues the processing with step S1106.

If step S1105 results in Yes, the cluster merging unit 30 merges the two clusters that should be merged (e.g., a first cluster and a second cluster) and generates a new cluster (S1106). For example, as shown in FIG. 10, the cluster merging unit 30 merges the first cluster C1 and the second cluster C2 determined to be merged and generates a new cluster C4.

Further, the cluster merging unit 30 generates the maximum, minimum, average, and the number of times of collection of the execution times for the new cluster, and causes the cluster storing unit 28 to store these values. The cluster merging unit 30 sets the maximum for one of the first and second clusters that includes longer execution times as the maximum for the new cluster. The cluster merging unit 30 also sets the minimum for one of the first and second clusters that includes shorter execution times as the minimum for the new cluster. This allows the cluster merging unit 30 to speedily determine the average of the execution times for the new cluster without the need of storing individual execution times.

The cluster merging unit 30 then generates the average and the number of times of collection for the new cluster based on the execution time in the first and second clusters. As an example, the cluster merging unit 30 may add the average multiplied by the number of times of collection for the first cluster to the average multiplied by the number of times of collection for the second cluster. The cluster merging unit 30 may then determine the average for the new cluster by dividing the result of the addition by the sum of the number of times of collection for the first cluster and that for the second cluster. The cluster merging unit 30 may also set the sum of the number of times of collection for the first cluster and that for the second cluster as the number of times of collection for the new cluster.

By performing the above processing, the detecting apparatus 10 can determine whether or not an extraordinary behavior occurred while merging clusters according to the sequentially acquired execution times of the monitored task 110. The detecting apparatus 10 may perform the processing of the above steps S1101 to S1106 after the learning period (or after the number of times of learning is exceeded). The detecting apparatus 10 may also perform the processing of steps S1101 to S1106 except step S1103 before the lapse of the learning period (or before the number of times of learning is exceeded) to generate clusters.

Even if the determining unit 32 determines that the acquired execution time falls within the range corresponding to a cluster (No in S1101), the determining unit 32 may still determine the occurrence of an extraordinary behavior for several execution times belonging to the range of a newly generated cluster counted from the generation of the new cluster. That is, the determining unit 32 may still determine the occurrence of an extraordinary behavior during the execution of the monitored task 110 if an execution time of the monitored task 110 newly executed after the cluster generating unit 26 has generated a new cluster falls within the range corresponding to the new cluster, and if the number of times of collection of the execution times belonging to the new cluster is less than a predetermined number. Thus, the detecting apparatus 10 can perform verification, debugging, and so on of the information processing apparatus 100 around the point of occurrence of the extraordinary behavior.

Figure 11:
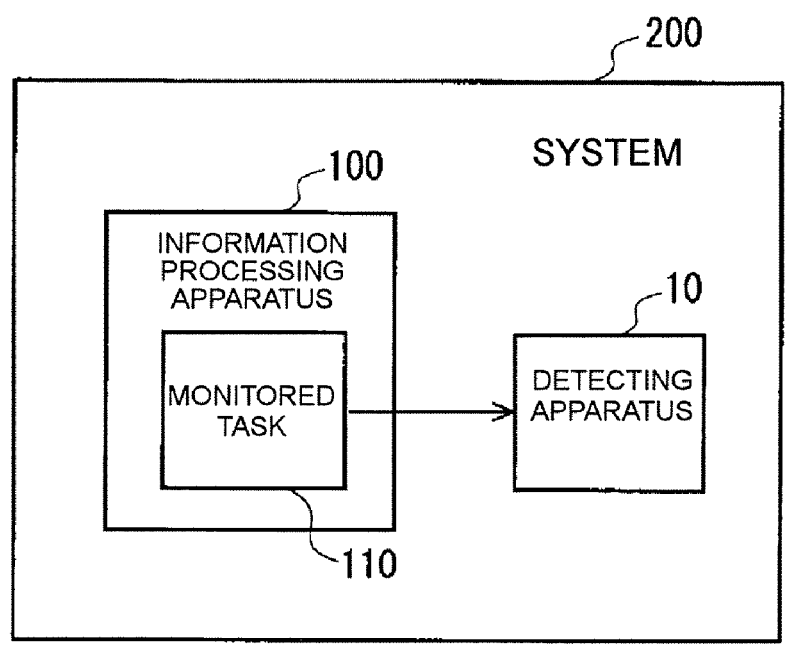
FIG. 11 shows the configuration of a system 200 according to a variation of the embodiment.

FIG. 11 shows the configuration of a system 200 according to a variation of this embodiment. The system 200 includes an information processing apparatus 100 and a detecting apparatus 10. Since the information processing apparatus 100 and the detecting apparatus 10 have almost the same configuration and functions as those shown in FIG. 1 respectively, only the differences will be described in detail below.

The information processing apparatus 100 and the detecting apparatus 10 are incorporated into a single apparatus. As an example, the information processing apparatus 100 and the detecting apparatus 10 may be implemented on a single IC chip, a single module, or a single substrate. The detecting apparatus 10 may be implemented by the information processing apparatus 100 executing a program. That is, the information processing apparatus 100 may execute both the program for implementing the detecting apparatus 10 and the monitored task 110 in parallel. According to the above variation, the detecting apparatus 10 is incorporated into the system 200 itself. Therefore, processing such as connecting the detecting apparatus 10 to the system 200 in verification and debugging can be eliminated to facilitate the verification, debugging, and so on.

A system according to a further variation may include an information processing apparatus 100 and a plurality of detecting apparatuses 10. Each of the detecting apparatuses 10 detects the execution time for a different execution cycle of the same monitored task 110 and determines whether an extraordinary behavior occurred. For example, in this system, the detecting apparatuses 10 may detect the execution time of the monitored task 110 in turn and determine whether an extraordinary behavior occurred in the respective execution cycles. Thus, in the system according to this further variation, the occurrence of an extraordinary behavior can be determined in real-time for all execution cycles even if the number of execution cycles of the monitored task 110 is relatively large with respect to the processing speed of the detecting apparatus 10.

Figure 12:
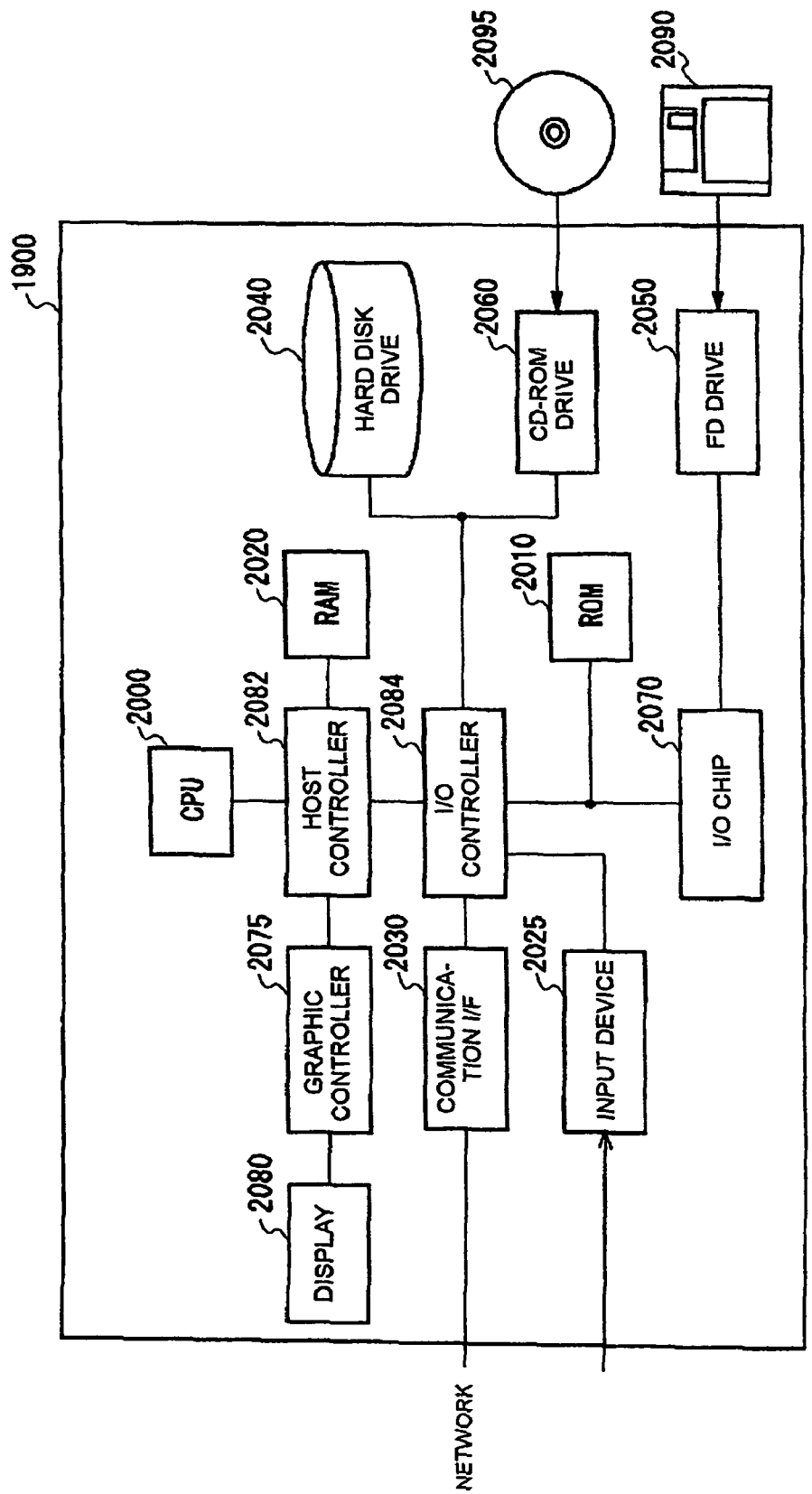
FIG. 12 shows an exemplary hardware configuration of a computer 1900 according to an embodiment of the present invention.

FIG. 12 shows an exemplary hardware configuration of a computer 1900 according to an embodiment of the present invention. The computer 1900 according to this embodiment includes a CPU peripheral section including a CPU 2000 serving as an instruction processor, a RAM 2020, a graphic controller 2075, and a display 2080, which are interconnected via a host controller 2082. The computer 1900 also includes an I/O section including an input device 2025, a communication interface 2030, a hard disk drive 2040, and a CD-ROM drive 2060, which are connected to the host controller 2082 via an I/O controller 2084. The computer 1900 also includes a legacy I/O section including a ROM 2010, a flexible disk drive 2050, and an I/O chip 2070, which are connected to the I/O controller 2084.

The host controller 2082 connects the RAM 2020 with the CPU 2000 and the graphic controller 2075 that access the RAM 2020 at high transfer rates. The CPU 2000 operates according to programs stored in the ROM 2010 and the RAM 2020 to control various components. The graphic controller 2075 obtains image data generated by the CPU 2000 and other components in a frame buffer provided in the RAM 2020 to cause images to be displayed on the display 2080.

Alternatively, the graphic controller 2075 may include a frame buffer for storing image data generated by the CPU 2000 and other components.

The I/O controller 2084 connects the host controller 2082 with the input device 2025 that inputs information from other apparatuses, and with the communication interface 2030, the hard disk drive 2040, and the CD-ROM drive 2060, which are relatively fast I/O devices. The communication interface 2030 communicates with other apparatuses over a network. The hard disk drive 2040 stores programs and data used by the CPU 2000 in the computer 1900. The CD-ROM drive 2060 reads a program or data from a CD-ROM 2095 and provides it to the hard disk drive 2040 via the RAM 2020.

Connected to the I/O controller 2084 are the ROM 2010 and relatively slow I/O devices including the flexible disk drive 2050 and the I/O chip 2070. The ROM 2010 stores programs such as a boot program executed by the computer 1900 during boot-up and programs dependent on the hardware of the computer 1900. The flexible disk drive 2050 reads a program or data from a flexible disk 2090 and provides it to the hard disk drive 2040 via the RAM 2020. The I/O chip 2070 connects the flexible disk drive 2050 and also connects various I/O devices via ports, for example a parallel port, serial port, keyboard port, and mouse port.

Programs to be provided to the hard disk drive 2040 via the RAM 2020 are stored on a recording medium such as the flexible disk 2090, the CD-ROM 2095, or an IC card and provided by a user. The programs are read from the recording medium, installed on the hard disk drive 2040 in the computer 1900 via the RAM 2020, and executed in the CPU 2000.

A program installed on the computer 1900 and causing the computer 1900 to function as the detecting apparatus 10 include a detecting module, an acquiring module, a cluster generating module, a cluster storing module, a cluster merging module, and a determining module. The program causing the computer 1900 to function as the detecting apparatus 10 may be executed by an information processing apparatus (the computer 1900) different from the information processing apparatus 100 or by the information processing apparatus 100 itself (the computer 1900).

The program or modules control the CPU 2000 and other components to cause the computer 1900 to function as the detecting unit 22, the acquiring unit 24, the cluster generating unit 26, the cluster storing unit 28, the cluster merging unit 30, and the determining unit 32. More specifically, the program or modules cause an input device such as the input device 2025 as the detecting unit 22, cause a storage device such as the RAM 2020 or the hard disk drive 2040 as the cluster storing unit 28, and cause the CPU 2000 as the acquiring unit 24, the cluster generating unit 26, the cluster merging unit 30, and the determining unit 32.

The above-described program or modules may be stored in an external storage medium. Besides the flexible disk 2090 and the CD-ROM 2095, the storage medium may be an optical recording medium such as a DVD or CD, a magneto-optical recording medium such as an MO, a tape medium, or a semiconductor memory such as an IC card. Alternatively, a storage device such as a hard disk or a RAM provided in a server system connected to a private communication network or the Internet may be used as the recording medium to provide the program to the computer 1900 over the network.

While the present invention has been described with respect to its embodiments, the technical scope of the present invention is not limited to that described in the above embodiments. It is apparent to those skilled in the art that various modifications or improvements can be made to the embodiments. It is apparent from the Claims that embodiments subjected to such modifications and improvements may also fall within the technical scope of the present invention.

The invention claimed is:

1. A detecting apparatus that detects whether or not extraordinary behavior occurred during the execution of monitored tasks on an information processing apparatus, comprising:
    a cluster storing unit that stores ranges corresponding to clusters into which an execution time of a previously executed monitored task is classified with an upper limit of each cluster being a maximum execution time in the cluster and a lower limit of each cluster being a minimum execution time in the cluster, wherein an upper limit of each range is a maximum of the execution time belonging to the corresponding cluster and a lower limit of each range is a minimum of the execution time belonging to the corresponding cluster;
    an acquiring unit that acquires the execution time of the monitored task in response to the newly executed monitored task on the information processing apparatus;
    a determining unit that determines occurrence of an extraordinary behavior during execution of the monitored task if the execution time of the newly executed monitored task does not fall within any of the ranges corresponding to the clusters; and
    a cluster merging unit that merges a first cluster and a second cluster into a single cluster when execution times for the first and second clusters satisfy a predetermined reference relationship.

2. The detecting apparatus according to claim 1, further comprising a cluster generating unit that generates at least one cluster by classifying execution time collected during a predetermined period beginning from a start of collecting the execution time of the monitored task, or by classifying a predetermined number of execution time counted from the start of collecting the execution time of the monitored task, wherein
    the determining unit detects whether or not an extraordinary behavior occurred during execution of the monitored task if the execution time, which was collected after a predetermined period or after a predefined number of execution time are captured, does not fall within the range corresponding to the cluster generated by the cluster generating unit.

3. The detecting apparatus according to claim 2, wherein the cluster generating unit comprises:
    an execution time storing unit that sequentially stores execution time collected during a predetermined period beginning from a start of collecting the execution times of the monitored task, or a predetermined number of execution time captures from a start of collecting the execution time of the monitored task; and
    a classifying unit that classifies each execution time collected during the predetermined period beginning from the start of collecting the execution time of the monitored task, or the predetermined number of execution time counted from the start of collecting the execution time of the monitored task, into clusters.

4. The detecting apparatus according to claim 2, wherein the cluster generating unit generates a new cluster in response to the determination of the occurrence of an extraordinary behavior by the determining unit and classifies the execution time determined not to fall within any of the ranges corresponding to the clusters into the new cluster.

5. The detecting apparatus according to claim 4, wherein the determining unit further determines occurrence of an extraordinary behavior during execution of the monitored task newly executed after generation of a new cluster if the execution time of the monitored task newly executed after the cluster generating unit generates the new cluster falls within a range corresponding to the new cluster and if the number of times of collection of the execution times belonging to the new cluster is less than a predetermined number.

6. The detecting apparatus according to claim 1, wherein the cluster merging unit merges one cluster and its adjacent cluster to a single cluster if the ratio of difference in the execution time between the cluster and its adjacent cluster to a maximum of the differences in the execution time between the cluster and any of the other clusters is less than a predetermined reference ratio.

7. The detecting apparatus according to claim 6, wherein
the cluster storing unit stores maximum, minimum, and average of the execution time of the monitored tasks for each cluster, and
the cluster merging unit uses the maximum, minimum, and average as the execution time of the clusters to determine whether or not the ratio of the difference in the execution time between the one cluster and the adjacent cluster to the maximum of the differences in the execution time between the one cluster and each of the other clusters is less than the predetermined reference ratio.

8. The detecting apparatus according to claim 1, wherein the cluster merging unit merges two clusters into a single cluster if a difference in the execution time between the two clusters is less than a predetermined reference difference.

9. The apparatus of claim 1 wherein the cluster merging unit merges a first cluster and a second cluster into a single cluster when at least one execution time for the first cluster satisfies a predetermined reference relationship to at least one execution time for the second cluster.

10. A system comprising an information processing apparatus and a detecting apparatus that detects whether or not an extraordinary behavior occurred during execution of monitored tasks on the information processing apparatus, wherein
the information processing apparatus executes the monitored tasks, and
the detecting apparatus comprises:
a cluster storing unit that stores ranges corresponding to clusters into which execution time of a previously executed monitored task are classified with an upper limit of each cluster being a maximum execution time in the cluster and a lower limit of each cluster being a minimum execution time in the cluster, wherein an upper limit of each range is a maximum of the execution times belonging to the corresponding cluster and a lower limit of each range is a minimum of the execution time belonging to the corresponding cluster;
an acquiring unit that acquires the execution time of the monitored tasks in response to new execution of the monitored tasks on the information processing apparatus;
a determining unit that determines an occurrence of an extraordinary behavior during execution of the monitored task if the execution time of a newly executed monitored task does not fall within any of the ranges corresponding to the clusters; and
a cluster merging unit that merges a first cluster and a second cluster into a single cluster when execution times for the first and second clusters satisfy a predetermined reference relationship.

11. The system of claim 10 wherein the cluster merging unit merges a first cluster and a second cluster into a single cluster when at least one execution time for the first cluster satisfies a predetermined reference relationship to at least one execution time for the second cluster.

12. The system according to claim 10, wherein the cluster merging unit merges one cluster and its adjacent cluster to a single cluster if the ratio of difference in the execution time between the cluster and its adjacent cluster to a maximum of the differences in the execution time between the cluster and any of the other clusters is less than a predetermined reference ratio.

13. The system according to claim 10, wherein the cluster merging unit merges two clusters into a single cluster if a difference in the execution time between the two clusters is less than a predetermined reference difference.

14. A program storage device storing a program of instructions for causing a computer to detect whether or not an extraordinary behavior occurred during execution of a monitored task on an information processing apparatus by means of one of the information processing apparatus or another information processing apparatus, the program causing the information processing apparatus or the other information processing apparatus to function as:
a cluster storing unit that stores, in a storage device provided in the information processing apparatus or the other information processing apparatus, ranges corresponding to clusters into which execution time of monitored tasks are classified with an upper limit of each cluster being a maximum execution time in the cluster and a lower limit of each cluster being a minimum execution time in the cluster, wherein an upper limit of each range is a maximum of the execution times belonging to the corresponding cluster and a lower limit of each range is a minimum of the execution times belonging to the corresponding cluster;
an acquiring unit that acquires an execution time of the monitored task in response to new execution of the monitored task on the information processing apparatus; and
a determining unit that determines occurrence of an extraordinary behavior during the execution of the monitored task if the execution time of the newly executed monitored task does not fall within any of the ranges corresponding to the clusters; and
a cluster merging unit that merges a first cluster and a second cluster into a single cluster when execution times for the first and second clusters satisfy a predetermined reference relationship.

15. The program storage device of claim 14 wherein the program further causes the instruction processor of the information processing apparatus or other information processing apparatus to function as a cluster merging unit whereby a first cluster and a second cluster are merged into a single cluster when at least one execution time for the first cluster satisfies a predetermined reference relationship to at least one execution time for the second cluster.

16. The program storage device of claim 14 wherein the program further causes the instruction processor of the information processing apparatus or other information processing apparatus to function as a cluster merging unit whereby the cluster merging unit merges one cluster and its adjacent cluster to a single cluster if the ratio of difference in the execution time between the cluster and its adjacent cluster to a maximum of the differences in the execution time between the cluster and any of the other clusters is less than a predetermined reference ratio.

17. The program storage device according to claim 14, wherein two clusters are merged into a single cluster if a difference in the execution time between the two clusters is less than a predetermined reference difference.

18. A detecting method for detecting whether or not an extraordinary behavior occurred during execution of a monitored task on an information processing apparatus by means of the information processing apparatus or another information processing apparatus, the method comprising:
- one of the information processing apparatus and the other information processing apparatus causing a storage device provided in the information processing apparatus or the other information processing apparatus to store ranges corresponding to clusters into which execution times of previously executed monitored task are classified with an upper limit of each cluster being a maximum execution time in the cluster and a lower limit of each cluster being a minimum execution time in the cluster, wherein an upper limit of each range is a maximum of the execution times belonging to the corresponding cluster and a lower limit of each range is a minimum of the execution times belonging to the corresponding cluster;
- an instruction processor of the information processing apparatus or the other information processing apparatus acquiring an execution time of the monitored task in response to new execution of the monitored task on the information processing apparatus; and
- the instruction processor of the information processing apparatus or the other information processing apparatus determining occurrence of an extraordinary behavior during the execution of the monitored task if the execution time of the newly executed monitored task does not fall within any of the ranges corresponding to the clusters; and
- the instruction processor of the information processing apparatus or the other information processing apparatus merging a first cluster and a second cluster into a single cluster when execution times for the first and second clusters satisfy a predetermined reference relationship.

19. The method of claim 18 further comprising the instruction processor of the information processing apparatus or other information processing apparatus merging a first cluster and a second cluster into a single cluster when at least one execution time for the first cluster satisfies a predetermined reference relationship to at least one execution time for the second cluster.

20. The method of claim 18 further comprising the instruction processor of the information processing apparatus or other information processing apparatus merging one cluster and its adjacent cluster to a single cluster if the ratio of difference in the execution time between the cluster and its adjacent cluster to a maximum of the differences in the execution time between the cluster and any of the other clusters is less than a predetermined reference ratio.

21. The method according to claim 18, wherein two clusters are merged into a single cluster if a difference in the execution time between the two clusters is less than a predetermined reference difference.

* * * * *